US011687546B2

(12) United States Patent
Boehme et al.

(10) Patent No.: US 11,687,546 B2
(45) Date of Patent: *Jun. 27, 2023

(54) EXECUTING CONDITIONS WITH NEGATION OPERATORS IN ANALYTICAL DATABASES

(71) Applicant: International Business Machines Corporation, Armonk, NY (US)

(72) Inventors: Thomas F. Boehme, Boeblingen (DE); Andreas Brodt, Gerlingen (DE); Daniel Martin, Stuttgart (DE); Oliver Schiller, Dettingen/Teck (DE)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/455,917

(22) Filed: Nov. 21, 2021

(65) Prior Publication Data

US 2022/0075774 A1    Mar. 10, 2022

Related U.S. Application Data

(63) Continuation of application No. 16/693,428, filed on Nov. 25, 2019, now Pat. No. 11,188,552, which is a
(Continued)

(51) Int. Cl.
*G06F 16/00* (2019.01)
*G06F 16/248* (2019.01)
(Continued)

(52) U.S. Cl.
CPC ........ *G06F 16/248* (2019.01); *G06F 16/2456* (2019.01); *G06F 16/24537* (2019.01); *G06F 16/278* (2019.01)

(58) Field of Classification Search
CPC ............ G06F 16/248; G06F 16/24537; G06F 16/2456; G06F 16/278
See application file for complete search history.

(56) References Cited

U.S. PATENT DOCUMENTS 7,676,450 B2    3/2010    Ahmed
8,019,750 B2    9/2011    Kosciusko
(Continued)

OTHER PUBLICATIONS

"Architectureoverview", Cassandra Wiki, last edited 2013-11-13 00:17:54 by GehrigKunz, 5 pages, <http://wiki.apache.org/cassandra/ArchitectureOverview>.
(Continued)

*Primary Examiner* — Alexander Khong
(74) *Attorney, Agent, or Firm* — Joseph P. Curcuru

(57) ABSTRACT

Embodiments of the present invention provide a method and system for processing a query on a set of data blocks in analytical databases. The query is on a set of data blocks, having at least one attribute and specifies at least one selection condition on the attribute. The selection condition is associated with at least one selection expression. Attribute value information on each attribute is generated for each data block. Next, a condition is generated on each attribute to negate the selection expression, if the selection expression has a negation operator. Additional conditions are generated for each selection expression that does not contain a negation operation. The attribute value is used to select the positive and negative subsets of data blocks for each condition. Next, a negative subset that does not require processing to evaluate the query is skipped and the positive subsets and the non-skipped negative subsets are processed.

12 Claims, 6 Drawing Sheets

Related U.S. Application Data continuation of application No. 15/618,165, filed on Jun. 9, 2017, now Pat. No. 10,540,361, which is a continuation of application No. 14/923,690, filed on Oct. 27, 2015, now Pat. No. 10,210,223.

(51) Int. Cl.
*G06F 16/2455* (2019.01)
*G06F 16/2453* (2019.01)
*G06F 16/27* (2019.01)

(56) References Cited

U.S. PATENT DOCUMENTS

| | | | |
|---|---|---|---|
| 8,352,461 | B2 | 1/2013 | Ahmed |
| 8,996,544 | B2 | 3/2015 | Ziauddin |
| 9,507,825 | B2 | 11/2016 | Baer |
| 9,779,136 | B2 | 10/2017 | Ivchenko |
| 10,210,223 | B2 | 2/2019 | Boehme |
| 10,540,361 | B2 | 1/2020 | Boehme |
| 2009/0313198 | A1 | 12/2009 | Kudo |
| 2014/0067789 | A1 | 3/2014 | Ahmed |
| 2014/0095520 | A1* | 4/2014 | Ziauddin ........... G06F 16/24557 707/E17.014 |
| 2015/0088812 | A1 | 3/2015 | Ziauddin |
| 2015/0286682 | A1* | 10/2015 | Ziauddin ........... G06F 16/24542 707/718 |
| 2020/0089674 | A1 | 3/2020 | Boehme |

OTHER PUBLICATIONS

"DE-9IM", Wikipedia, the free encyclopedia, last modified Aug. 13, 2015, 11 pages, <https://en.wikipedia.org/wiki/DE-9IM>.

"Using Zone Maps", Database Data Warehousing Guide, © 2015 Oracle and/or its affiliates, Printed Sep. 28, 2015, 26 pages, <http://docs.oracle.com/database/121/DWHSG/zone_maps.htm#DWHSG9355>.

Bloom, "Space/Time Trade-offs in Hash Coding with Allowable Errors", Communications of the ACM, vol. 13, No. 7, Jul. 1970, pp. 422-426.

Chainani et al., "DB2 with BLU Acceleration: a rapid adoption guide", developerWorks, © IBM Corporation 2013, 2015, May 7, 2015 (First published Sep. 19, 2013), pp. 1-15.

Chang et al., "Bigtable: a Distributed Storage System for Structured Data", ACM Transactions on Computer Systems, vol. 26, No. 2, Article 4, Jun. 2008, pp. 1-26.

IBM: List of IBM Patents or Patent Applications Treated as Related. Filed Herewith. 2 pages.

Nbayliss-Oracle, "Optimizing Table Scans with Zone Maps", The Data Warehouse Insider, Oracle, Nov. 11, 2014, 8 pages.

* cited by examiner

EXECUTING CONDITIONS WITH NEGATION OPERATORS IN ANALYTICAL DATABASES

BACKGROUND OF THE INVENTION

The present invention relates generally to the field of databases, and more particularly to a system and method for processing a query comprising a negation operator.

Analytical database systems manage very large amounts of data and are optimized for queries that must read large portions of it. Additionally, analytical database systems offer the complete querying power of SQL. As such systems do not focus on OLTP load (i.e., involving point queries) they typically do not index each data row, but heavily rely on scan performance. Nevertheless, to speed up scan performance, analytical database systems often store information on blocks of data.

SUMMARY

According to one embodiment of the present invention, a method for processing a query on a set of data blocks, the method comprising: receiving the set of data blocks and the query, wherein the set of data blocks comprises at least one attribute and, wherein the query specifies a selection condition on the at least one attribute, wherein the selection condition comprises at least one selection expression; generating an attribute value information on the at least one attribute, for each data block of the set of data blocks; generating a first conditions on the at least one attribute, wherein the condition negates each selection expression of the at least one selection expression, when the selection expression comprises a negation operator; generating a first set of conditions that comprises the generated first conditions on the at least one attribute, and each of the at least one selection expression that does not comprise a negation operator; selecting a positive subset of data blocks, of the set of data blocks, for each condition of the first set of conditions, wherein the positive subset of data blocks, of the set of data blocks satisfies a condition of the first set of conditions, using the attribute value information; selecting a negative subset of data blocks, of the set of data blocks, for each condition of the first set of conditions, wherein the negative subset of data blocks, of the set of data blocks does not satisfies a condition of the first set of conditions, using the attribute value information; determining a skipped portion of the negative subsets of the data blocks, using the selection condition, and a non-skipped portion of the negative subsets of the data blocks, using the selection condition; generating result data, wherein the generated result data comprises: processing the positive subset of the data blocks, and processing the negative portion non-skipped portion of the negative subsets of the data blocks. An alternative embodiment, comprises determining a skipped portion of the negative subsets of the data blocks, using the selection condition, and a non-skipped portion of the negative subsets of the data blocks; and generating result data based on the skipped portion of the negative subsets of the data blocks and the non-skipped portion of the negative subsets of the data blocks.

Another embodiment of the present invention provides a computer program product for processing a query on a set of data blocks, based on the method described above.

Another embodiment of the present invention provides a computer system for processing a query on a set of data blocks, based on the method described above.

DETAILED DESCRIPTION

Figure 1:
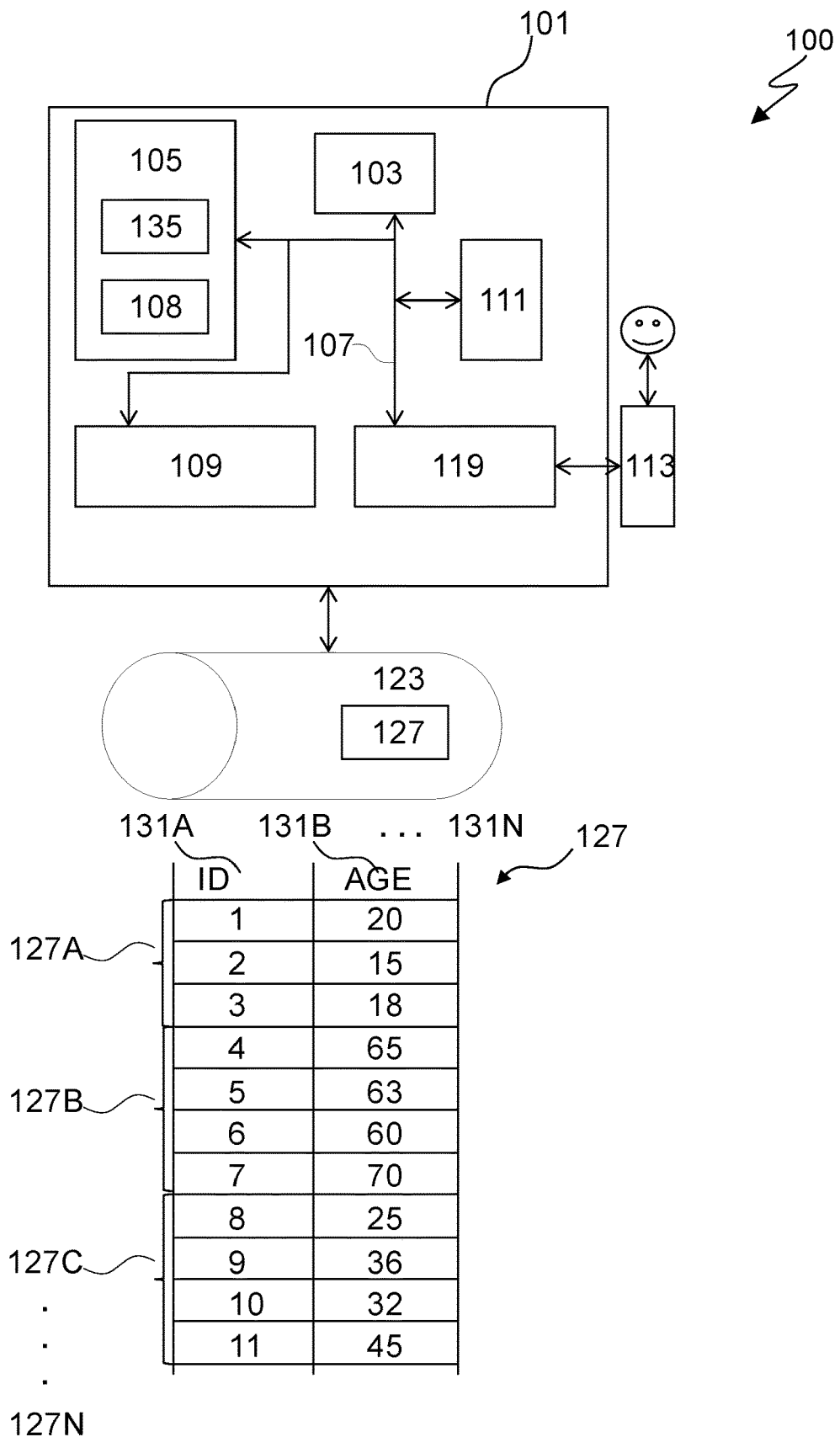
FIG. 1 is a block diagram illustrating a data processing system, in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The set of data blocks may be obtained by a division of a dataset. The division of the dataset may be performed using the values of the attribute. The division of the dataset may be randomly performed or through a preselection criterion for example, using values of the attribute. The random division may particularly be advantageous for the range searches as it may provide data blocks that can be equally processed. The preselection based division may be advantageous as it may provide a controlled optimized access to data blocks. The preselection criterion may comprise one of: the data blocks are equally sized; the data blocks contain the same number of entries.

The set of data blocks may be stored on a disk and/or a memory of a computer system. For example, the values of the attribute comprise date values e.g., 2009 and August. In this example, all entries of the data block represented by the attribute value information (2009, August) have date values that match that period. For instance, an entry of the given data block may have a date value of 2009.08.01, another entry of the given data block may have a date value of 2009.08.25, etc.

The term "dataset" as used herein refers to a collection of data such as, for example, a data table, database or a list. The collection of data may be presented in tabular form. Each column may represent a particular variable or attribute. Each row may represent a given member, record or entry of the dataset.

The term "disk" as used herein may comprise a hard disk drive (HDD), a direct access storage device (DASD) or a logical unit number (lun) in a storage device. The term "disk" is intended to embrace not only magnetic storage devices, but also optical, solid state, and other types of storage devices known in the art.

The term "operator" as used herein refers to an operator, P, that tests values or range of values against an attribute. The operator may, for example, comprise a relational operator that tests or defines a relation or condition between two entities including at least the attribute. These include equality (e.g., Attribute=5) and inequalities (e.g., attribute$\geq$3). Negation Operator P− as used herein refers to an operator that tests a condition "not p" which is interpreted as being true when condition p (tested by corresponding operator P) is true and false when p is true. An example of negation operators may comprise (not equal) or a SQL NOT that negates positive operators.

The term "selection expression" as used herein refers to an expression that is created using an operator and/or negation operator as described above. The selection expression may form a so-called relational expression or a condition. The selection expression (or predicate) may consist of: a data item or attribute, an operator or negation operator, and a value. A positive (negative) predicate or selection expression may comprise an operator (negation operator).

The present method may use the attribute value information on negated predicates, anti-joins, left outer joins, and full outer joins, as-is. This attribute value information may be used to skip the predicate or join evaluation for at least part of the set of data blocks.

In this exemplary embodiment, when a query contains a negative predicate or join, it is negated to obtain a positive predicate. Then rows that do not match the positive predicate are determined. The attribute value information may indicate that a given data block definitely contains no rows that match a positive predicate. Thus when looking for rows that do not match the negative predicate, all rows in the given data block can directly be fed to further query processing. There may be no need to check every single row of the given data block. Only data blocks that, according to attribute value information, may or may not contain positive matches for the positive predicate (and thus also negative matches for the negative predicate), may be checked row-by-row. This enables a reduction in CPU load for negated predicates and joins.

The above features may enable performance of an optimal selection of data blocks selected from the set of data blocks without having to fully scan content of each data block of the set of data blocks e.g., on disk. This may preserve processing resources in the computer system, for instance, fewer computer processing resources are required. In addition, the present method may further save processing resources in that only part of the set of data blocks may be scanned or processed in order to evaluate a query that comprises a negation operator.

According to this exemplary embodiment, the selection condition comprises a conjunction of a first and second selection expression. Each of the first and second selection expressions comprise a respective negation operator, wherein determining the skipped portion comprises: selecting common data blocks of the first negative subset of data blocks and the second negative subset of data blocks, the skipped portion of the data blocks comprising the selected common data blocks. In this embodiment, the skipped portion of data blocks may be part of the results of the query as it may satisfy the query.

According to an exemplary embodiment, the selection condition comprises a disjunction of a first and second selection expression. Each of the first and second selection expressions comprising a respective negation operator, the skipped portion of the data blocks comprising the first negative subset of data blocks and the second negative subset of data blocks. In this embodiment, the skipped portion of data blocks may be part of the results of the query as it may satisfy the query.

According to an exemplary embodiment, the selection condition comprises a conjunction of a first and second selection expression, the first selection expression comprising a positive operator and the second selection expression comprising a negation operator, the skipped portion of the data blocks comprising the first negative subset of data blocks.

According to an exemplary embodiment, the non-skipped portion of the negative subsets of data blocks comprises the second negative subset of data blocks, hereafter referred to as Ln−. The positive subsets of the data blocks comprises a first positive subset of the data blocks, hereafter referred to as Lp+, which satisfies the first selection expression; as well as a second positive subset of the data blocks, hereafter referred to as Ln+, which satisfies the generated condition that negates the second selection expression. The processing comprises processing data blocks that satisfy Lp+$\cap$ Ln+ for evaluating the selection condition; and processing data blocks that satisfy Lp+$\cap$ Ln− for evaluating the first selection expression. This enables an accurate selection of data blocks to be processed and which condition to be evaluated. In this embodiment, the skipped portion of data blocks Lp− may not be part of the results of the query as it may not satisfy the query.

According to an exemplary embodiment, the selection condition may comprise a disjunction of a first and second selection expression. For example, the first selection expression comprises a positive operator and the second selection expression comprises a negation operator, the skipped portion of the data blocks comprising the second negative subset of data blocks.

According to an exemplary embodiment, the non-skipped portion of the negative subsets of data blocks comprises the first negative subset of data blocks, hereafter referred to as Lp−. Further, the positive subsets of the data blocks comprising (1) a first positive subsets of the data blocks, hereafter referred to as Lp; and (2) a second positive subsets of the data blocks, hereafter referred to as Ln. Thereby enabling Lp+ to satisfy the first selection expression while Ln+ satisfies the generated condition that negates the second selection expression. The processing comprises: processing data blocks that satisfy Lp+$\cap$ Ln+ for evaluating the selection condition; processing data blocks that satisfy Lp+\(Ln−$\cup$(Lp+ˆLn+)) for evaluating the first selection expression; processing data blocks that satisfy Lp−$\cap$ Ln+ for evaluating the second selection expression. This embodiment may enable an accurate selection of data blocks to be processed and which condition to be evaluated which may thus save processing resources compared to e.g., a case where the processing is performed using the (full) selection condition on all data blocks excluding the skipped portion of data blocks. In the present example, three different sets of data blocks are identified and a respective selection condition is evaluated. Therefore, the skipped portion of data blocks (Ln−) may satisfy the query and may be part of the results of the query.

According to an exemplary embodiment, the attribute is comprised in a first and second data table. The second data table comprises the set of data blocks. The selection condition comprises an anti join on the attribute of the first data table and the second data table. The skipped portion comprises the negative subset of data blocks that does not satisfy the generated condition that negates the selection expression of the anti-join. For example, the second data table may be on the right side of the ant-join operator. The skipped portion in this embodiment may satisfy the query and may be part of the query result. For example, for each entry or row of the first data table this embodiment may be performed such that data blocks that may not comprise (e.g., using SQL statement NOT EXISTS) entry may be identified as described herein.

According to an exemplary embodiment, the attribute value information comprises an indication of the minimum and maximum values of the attribute in the data block. This may enable efficient data block selection in particular for point and range searches.

According to an exemplary embodiment, providing the attribute value information may encompass: generating a multidimensional data structure for representing the set of data blocks; for each data block of the set of data blocks adding a respective data element into the multidimensional data structure, where the data element has multiple values indicative of the attribute.

The term multidimensional data structure refers to a data structure for indexing multidimensional information. The multidimensional data structure may, for example, represent a map that is viewed as a two dimensional image, wherein points on the map are stored as data elements on the multidimensional data structure. The multidimensional data structure may comprise a spatial index. The multidimensional data structure supports various types of queries, e.g., a range query. The range query retrieves all tuples of a multidimensional space matched by a query rectangle.

In an exemplary embodiment, the multidimensional data structure comprises a spatial index. A spatial index may be used to divide the indexed space (space defined by the multiple values of the attribute and covering the data elements of the spatial index) into search rectangles (or index rectangles) each made up of a respective number of data elements. For example, a search rectangle may be defined by a lower left corner and an upper right corner. If, in a scenario, the multiple attribute values assigned to a given data element comprise the minimum and maximum values of the first attribute in the respective data block, then (1) the lower left corner may be defined by the lowest minimum and maximum values of the requested range and (2) the upper right corner may be defined by the highest minimum and maximum values of the requested range. Only search rectangles which are covered by the query area may be searched, using this data structure.

For example, a search rectangle may be completely contained in the query area. Alternatively, a search rectangle may be partially overlapping with the query area. Alternatively, a search rectangle may be disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

According to an exemplary embodiment, selecting of the positive subset of data blocks and the negative subset of data blocks comprises selecting data elements of the multidimensional data structure whose multiple values satisfy the condition of the group of conditions, then, the positive subset of data blocks and the negative subset of data blocks comprises data blocks that correspond to the selected data elements. This may speed the selection process as the attribute value information of a given data block are represented by a single entry in the multidimensional data structure. Instead of performing multiple selections on respective attribute value information, the present embodiment may enable a single selection on entries of the multidimensional data structure. This may further preserve processing resources, in particular for processing Big Data with millions of data bocks.

According to an exemplary embodiment, the multiple values comprise the maximum and the minimum values of the attribute in the respective data block; whereas the multidimensional data structure comprising a spatial index.

According to an exemplary embodiment, if the attribute is a multi-value attribute comprising a first and a second value, then the first and second values are treated as a two-dimensional point in the multidimensional data structure. Generally a multi-value attribute is an attribute whose value holds or indicate multiple information such as a date value or phone number etc. For example, the multi-value attribute may have or encompass at least a first sub-attribute and a second sub-attribute (e.g., a date attribute written as Year.Month.Day is a multi-value attribute having "year", "month" and "day" as sub-attributes). For example, in case of the date value, the first value may indicate the year, and the second value may relate to the month. This embodiment may further enlarge the data samples that would benefit from the selective data block access e.g., not limited to range searches or selections.

According to an exemplary embodiment, a negation operator has an inequality predicate. Alternatively, a negation operator has a negated range predicate. Alternatively, a negation operator has both an inequality predicate and a negated range predicate.

FIG. 1 depicts a block diagram illustrating data processing system 100, in accordance with an embodiment of the present invention. It should be appreciated that FIG. 1 provides only an illustration of one implementation and does not imply any limitations with regard to the environments in which different embodiments may be implemented. Examples of computer systems, environments, and/or configurations that may be represented by the components illustrated in FIG. 1 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Data processing system 100 comprises a computer system 101. The components of computer system 101 may include, but are not limited to, one or more processors or processing units (processor) 103, a persistent storage 111, a memory 105, and a communications fabric 107 that couples various system components including memory 105 to processor 103. Persistent storage 111 may include, for example, a hard disk drive (HDD). Memory 105 may include computer system readable media in the form of volatile memory, such as random access memory (RAM) and/or cache memory.

Computer system 101 includes communications fabric 107, which provides for communications between one or more processors 103, memory 105, persistent storage 111, communications unit 109, and one or more input/output (I/O) interfaces 119. Communications fabric 107 can be implemented with any architecture designed for passing data and/or control information between processors (such as microprocessors, communications and network processors, etc.), system memory, peripheral devices, and any other hardware components within a system. For example, communications fabric 107 can be implemented with one or more buses.

Computer system 101 typically includes a variety of computer system readable media. Such media may be any available media that is accessible by computer system 101, and it includes both volatile and non-volatile media, removable and non-removable media.

Communications unit 109 provides for communications with other computer systems or devices via a network (e.g., network). In this exemplary embodiment, communications unit 109 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 109 (e.g., via the Internet, a local area network or other wide area network). From communications unit 109, the software and data can be loaded onto persistent storage 111.

Computer system 101 may also communicate with one or more external devices such as a keyboard, a pointing device, a display 113, etc.; one or more devices that enable a user to interact with computer system 101; and/or any devices (e.g., network card, modem, etc.) that enable computer system 101 to communicate with one or more other computing devices. Such communication can occur via I/O interface(s) 119. Still yet, computer system 101 can communicate with one or more networks such as a local area network (LAN), a general wide area network (WAN), and/or a public network (e.g., the Internet) via communications unit 109. As depicted, communications unit 109 communicates with the other components of computer system 101 via communications fabric 107.

Memory 105 is configured to store applications that are executable on the processor 103. For example, the memory 105 may comprise an operating system as well as application programs. The application programs comprise a data processing application. The data processing application may have access to at least one dataset (or data table) 127. For example, the data processing application may receive (automatically or upon request) as input the dataset 127, or may download the dataset 127 from a data source system 123. Memory 105 and persistent storage 111 are computer readable storage media. In this embodiment, memory 105 includes random access memory (RAM) 135 and cache memory 108. In general, memory 105 can include any suitable volatile or non-volatile computer readable storage media. Software is stored in persistent storage 111 for execution and/or access by one or more of the respective processors 103 via one or more memories of memory 105.

Persistent storage 111 may include, for example, a plurality of magnetic hard disk drives. Alternatively, or in addition to magnetic hard disk drives, persistent storage 111 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 111 can also be removable. For example, a removable hard drive can be used for persistent storage 111. Other examples include optical and magnetic disks, thumb drives, and smart cards that are inserted into a drive for transfer onto another computer readable storage medium that is also part of persistent storage 111.

Data processing system 100 may further comprise data source system 123. Data source system 123 may, for example, comprise a Hadoop platform. Data source system 123 may provide and store dataset 127. Data source system 123 is connected to the computer system 101 via communications unit 109 through one or more networks for example, the Internet, a local area network, a wide area network and/or a wireless network. In addition or alternatively the dataset 127 may be stored on the persistent storage 111 and/or on memory 105.

Dataset 127 may comprise one or more columns 131A-N, wherein each column is represented by a respective attribute (e.g., "ID" and "Age", etc.). The rows of dataset 127 may comprise values of the attributes. Dataset 127 may, for example, be divided into a set of data blocks 127A-N, e.g., using the attribute 131B. The set of data blocks 127A-N are shown for clarity of the description and may be created before or while executing the present method as described below.

Figure 2:
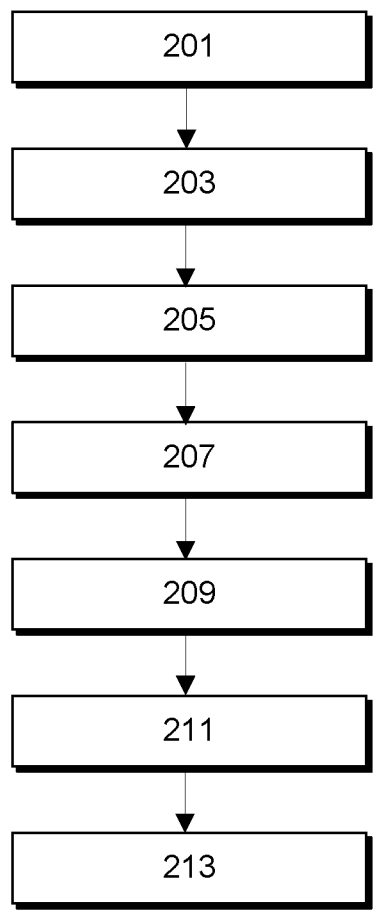
FIG. 2 is a flowchart illustrating operational steps for processing a query on a set of data blocks, in accordance with an embodiment of the present invention.

FIG. 2 is flowchart 200 illustrating operational steps for processing a query on a set of data blocks 127A-N, in accordance with an embodiment of the present invention. The query specifies at least one selection condition on attribute 131B (attribute references FIG. 1) that is comprised in each of the set of data blocks. The selection condition comprises one selection expression or a combination of more than one selection expression.

Each selection expression of the selection condition may be a selection condition on the attribute. In other words, the selection condition may be a combination of one or more sub-conditions (e.g., that may form sub-queries). The selection expression may be a logical expression that can be in the form of a plurality of terms connected via an operator, such as a relational operator. For example, at least one of the selection expressions of the selection condition may comprise a negation operator.

For example, the selection condition may be: "Age≠20∩Age≠30", which is a combination of two selection expressions: "Age≠20" and "Age≠30". The example requires that the value of the attribute "Age" be different from 20 and 30, respectively. Therefore, the combination in this example is a conjunction of selection expression "Age≠20" and selection expression "Age≠30". In this example, each of the selection expressions comprises a negation operator (inequality) that negates the positive operator=(equality).

In step 201, for each data block of the set of data blocks 127A-N, attribute value information on the attribute 131B may be generated. Alternatively, in step 201, for each data block, attribute value information on the attribute 131B may be provided. Alternatively, in step 201, for each data block, attribute value information on the attribute 131B may be assigned.

The attribute value information may, for example, comprise the minimum and maximum values of the attribute 131B in each data block of the set of data blocks 127A-N. Alternatively, the attribute 131B may, for example, comprise a multi-value attribute encompassing at least a first sub-attribute and a second sub-attribute (e.g., a date attribute written as Year.Month.Day is a multi-value attribute having "year", "month", and "day" as sub-attributes); wherein the attribute value information may comprise distinct values of the first and second sub-attributes in a given table e.g., dataset 127.

The attribute value information may, for example, be stored as metadata. The metadata may indicate each data block of the set of data blocks 127A-N in association with corresponding attribute value information. The metadata may be provided, for example, in the form of a data structure or index linking the attribute value information to their corresponding data blocks 127A-N. Further detail regarding step 201 may be found with respect to FIG. 5.

In step 203, for each selection expression that comprises a negation operator a condition on the attribute 131B that negates the selection expression may be generated. Generally, the negation of a selection expression refers to an operation that takes a proposition or condition "not p" to another proposition "p". Step 203 may be performed in response to receiving a request to perform the query. In another embodiment, step 203 may automatically be performed by automatically generating the query for the evaluation of the query.

The query, for example, may be parsed to identify negation operators e.g., by comparing the operator of each selection expression to a predefined list of negation operators that is e.g., stored on computer system 101. In another example, the query may be received from a user, wherein the received query further indicates the selection expressions of the selection condition that contain the negation operator. The term "user" as used herein may refer to an entity, such as an individual, a computer, or an application executing on a computer that inputs or issues the query, and the like.

Following the above example, each of the selected selection expressions Age≠20 and Age≠30 may be negated such that they become "Age=20" and "Age=30", respectively. The group of conditions of step 205 may thus comprise individual conditions "Age=20" and "Age=30" to be individually evaluated as described below.

In step 205, a group of conditions may be provided or defined or generated that comprises the generated conditions ("Age=20" and "Age=30") and each selection expression of the selection condition that does not comprise a negation operator.

In step 207, the attribute value information may be used in order to select a positive subset of data blocks (Ln+), and a negative subset of data blocks (Ln−), for each condition of the group of conditions. The positive subset of data blocks (Ln+), of the set of data blocks 127A-N, may satisfy the condition of the group of conditions. Similarly, the negative subset of data blocks (Ln−), of the set of data blocks 127A-N, does not satisfy the condition of the group of conditions. This may result in a list of positive subsets of data blocks (Ln+1, Ln+2 . . . ) and a list of negative subsets of data blocks (Ln−1, Ln−2 . . . ) for respective conditions in the group of conditions.

For example, by reading the minimum and maximum values of the attribute 131B, of the set of data blocks 127A-N, it can be determined which data block can comprise the value of the attribute 30 or 20. Since the data block 127B has a range of values [60 70], it would not contain values 20 or 30 and thus, would be part of the negative subsets of data blocks Ln−1 that corresponds to condition "Age=20" and part of the negative subsets of data blocks Ln−2 that corresponds to condition "Age=30". However, data blocks 127A and 127C can contain values 20 and 30, respectively.

Data block 127A may be part of the positive subsets of data blocks Ln+1 that corresponds to condition "Age=20" and data block 127C may be part of the positive subsets of data blocks Ln+2 that corresponds to condition "Age=30". Data blocks 127A and 127C are candidates only and still need to be processed (e.g., row by row) to evaluate the query.

Among the list of negative subsets of data blocks Ln−1, Ln−2 . . . , a skipped portion of the negative subsets of data blocks that does not require processing for evaluating the query may be determined in step 209. The determination may be performed using or depending on the selection condition. For instance, at least part of the skipped portion may be determined to either satisfy or not satisfy the query, without having to process row by row data blocks of the skipped portion (e.g., the evaluation may be skipped for the skipped portion).

If the selection condition comprises a single selection expression (e.g., "Age≠20"), then the skipped portion of the data blocks comprises the negative subsets of data blocks that do not satisfy the negation "Age=20" of the condition "Age≠20".

Following the above example, the selection condition comprises a conjunction "Age≠20∩Age≠30" of selection expressions "Age≠20" and "Age≠30". In this case, the skipped portion of data blocks comprises common data blocks of the first negative subset of data blocks Ln−1 that does not satisfy the condition "Age=20" that negates the condition "Age≠20" of the query, and the second negative subset of data blocks Ln−2, that does not satisfy the condition "Age=30" that negates the condition "Age≠30" of the query. The first negative subset of data blocks Ln−1 does not satisfy the condition "Age=20" negating the condition "Age≠20" of the query. Similarly, the second negative subset of data blocks Ln−2 does not satisfy the condition "Age=30" that negates the condition "Age≠30" of the query. As described above the first negative subset of data blocks Ln−1 comprises data block 127B, and the second negative subset of data blocks Ln−2 comprises data block 127B. Therefore, the common data blocks (Ln−1∩ Ln−2) comprises data block 127B that would be skipped when evaluating the query e.g., row by row.

In another example, the selection condition may comprise a disjunction of selection expressions e.g., the selection condition may comprise a disjunction "Age≠20∪Age≠30" of selection expressions "Age≠20" and "Age≠30". In this case, the skipped portion of data blocks comprises union or combination (Ln−1∪ Ln−2) of the first negative subset of data blocks Ln−1 that does not satisfy the condition "Age=20" that negates the condition "Age≠20" of the query, and the second negative subset of data blocks Ln−2 that does not satisfy the condition "Age=30" that negates the condition "Age≠30" of the query. In this example, Ln−1∪ Ln−2 may comprise the data block 127B.

In step 211, at least part of the positive subsets of the data blocks (Ln+1, Ln+2 . . . ) and the non-skipped portion of the negative subsets of data blocks (Ln−1, Ln−2 . . . ) may be processed for evaluating the query. The processing yields result data blocks of the processed data blocks. The result data blocks may have zero or more data blocks. The non-skipped portion of the negative subsets of data blocks may comprise data blocks that are not part of the skipped portion of the data blocks and are part of the negative subsets of data blocks.

Following the above example, the result data blocks comprise data block 127C as it satisfies the selection condition "Age≠20∩Age≠30", as both conditions Age≠20 and Age≠30 are verified in data block 127C.

The skipped portion of data blocks may not be processed for the evaluation of the query, as it is already determined that the skipped portion of the data blocks satisfy the query without requiring row by row processing. In this way the processing resources may be saved as only relevant data blocks may be processed. Following the above example of selection condition ("Age≠20∩Age≠30") data block 127B may be excluded from processing the query as there may be no need to process the data block 127B in order to evaluate the query, as it satisfies the query.

In step 213, which may be optional, a set of results that satisfy the selection condition (i.e., the query) may be defined and/or provided. The set of results comprises the result data blocks. The set of results may further comprise at least part of the determined skipped portion of the data blocks depending on the selection condition e.g., for inequality predicates.

Following the above example, the set of results comprise data blocks 127B and 127C as they satisfy the selection condition "Age≠20∩Age≠30"; however, only data block 127C is processed e.g., row by row.

Figure 3:
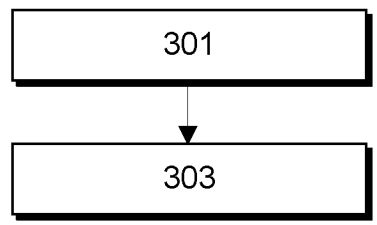
FIG. 3 is a flowchart illustrating operational steps for processing a query on a set of data blocks, in accordance with another embodiment of the present invention.

FIG. 3 is a flowchart illustrating operational steps for processing a query on a set of data blocks 127A-N, further depicting step 211 of FIG. 2, in accordance with another embodiment of the present invention. The query specifies a selection condition on an attribute 131B that is comprised in each of the set of data blocks. The selection condition comprises a disjunction of a first and second selection expressions (e.g., "Age=25∪Age≠63"). The first selection expression comprises a positive operator (e.g., "Age=25") and the second selection expression comprises a negation operator (e.g., Age≠63).

Steps 201-209 may be executed in order to define the skipped portion of the data blocks. In this example, the skipped portion of data blocks comprises the first negative subset of data blocks Lp− (index p refers to positive as the first selection expression e.g., "Age=25" is not a negation condition) that do not satisfy the first selection expression (e.g., "Age=25"). Thus, the non-skipped portion of the negative subsets of data blocks comprises the second negative subset of data blocks Ln− (index n (as above) refers to negation as the second selection expression "Age≠63" involves a negation operator). Generally, the second negative subset of data blocks Ln− does not satisfies the generated condition (e.g., "Age=63") as well as that negates the second selection expression (e.g., "Age≠63"). The positive subsets of the data blocks comprises a first positive subset of the data blocks Lp+ that satisfies the first selection expression ("Age=25") and a second positive subset of the data blocks Ln+ that satisfies the generated condition (e.g., "Age=63") that negates the second selection expression (e.g., "Age≠63").

The processing performed in step 211 may comprise steps 301-303. In step 301, data blocks that satisfy Lp+∩ Ln+ (i.e., data blocks that belong to both Lp+ and Ln+) are processed for evaluating the selection condition (e.g., "Age=25∪Age≠63"). Then in step 303, data blocks satisfying Lp+∩ Ln− (i.e., data blocks that belong to both Lp+ and Ln−), may be processed for evaluating the first selection expression "Age=25".

Figure 4:
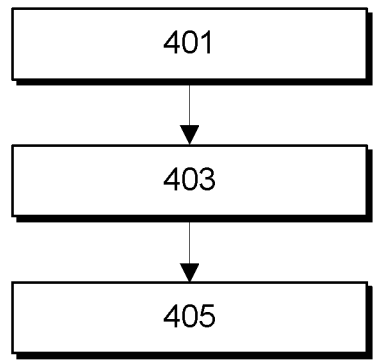
FIG. 4 is a flowchart illustrating operational steps for processing a query on a set of data blocks, in accordance with another embodiment of the present invention.

FIG. 4 is a flowchart illustrating operational steps for processing a query on a set of data blocks 127A-N, further detailing step 211 of FIG. 2, in accordance with another embodiment of the present invention. The query specifies a selection condition on an attribute 131B that is comprised in each of the set of data blocks 127A-N. The selection condition comprises a conjunction of a first and second selection expressions (e.g., "Age=25∩Age≠63"). The first selection expression comprises a positive operator (e.g., "Age=25") and the second selection expression comprises a negation operator (e.g., Age≠63).

Steps 201-209 may be executed in order to define the skipped portion of the data blocks. In this example, the skipped portion of data blocks comprises the second negative subset of data blocks Ln− that does not satisfies the generated condition (e.g., "Age=63") that negates the second selection expression (e.g., "Age≠63"). Thus, the non-skipped portion of the negative subsets of data blocks comprises the first negative subset of data blocks Lp− that does not satisfy the first selection expression (e.g., "Age=25"). The positive subsets of the data blocks comprises a first positive subset of the data blocks Lp+ that satisfies the first selection expression ("Age=25") and a second positive subset of the data blocks Ln+ that satisfies the generated condition (e.g., "Age=63") that negates the second selection expression (e.g., "Age≠63").

Thereby, the processing performed in step 211 may comprise steps 401-405. In step 401, data blocks that satisfy (or belong to) Lp+∩ Ln+ are processed for evaluating the selection condition (e.g., "Age=25∩Age≠63"). In step 403, data blocks that satisfy (or belong to) Lp+\(Ln−∪(Lp+ ˆLn+)) are processed for evaluating the first selection expression (e.g., "Age=25"). Therefore, in step 405, data blocks that satisfy (or belong to) Lp−∩ Ln+ are processed for evaluating the second selection expression (e.g., "Age≠63").

Figure 5:
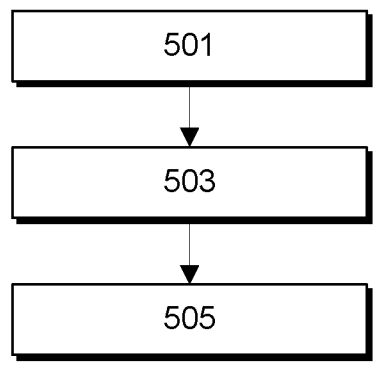
FIG. 5 is a flowchart illustrating operational steps for accessing the attribute value information, in accordance with an embodiment of the present invention.

FIG. 5 is a flowchart illustrating operational steps for accessing the attribute value information (i.e., step 201 of FIG. 2), in accordance with an embodiment of the present invention.

In step 501, a multidimensional data structure may be generated for representing the set of data blocks 127A-N. The multidimensional data structure may for example comprise a spatial index.

In step 503, for each data block of the set of data blocks 127A-N a respective data element may be added into the multidimensional data structure, wherein the data element has multiple values indicative of the attribute 131B.

For performing the step of selecting of the positive subset of data blocks and the negative subset of data blocks (step 207), data elements of the multidimensional data structure whose multiple values satisfy the condition of the group of conditions may be selected in step 505, wherein the positive subset of data blocks comprising data blocks that correspond to the selected data elements and the negative subset of data blocks comprising data blocks that correspond to non-selected data elements of the multidimensional data structure.

As described above only data blocks that, according to attribute value information, may or may not contain positive matches for the positive predicate (that negate a negative predicate) may be checked row-by-row. This may further illustrated by following examples for the selection conditions.

Figure 6:
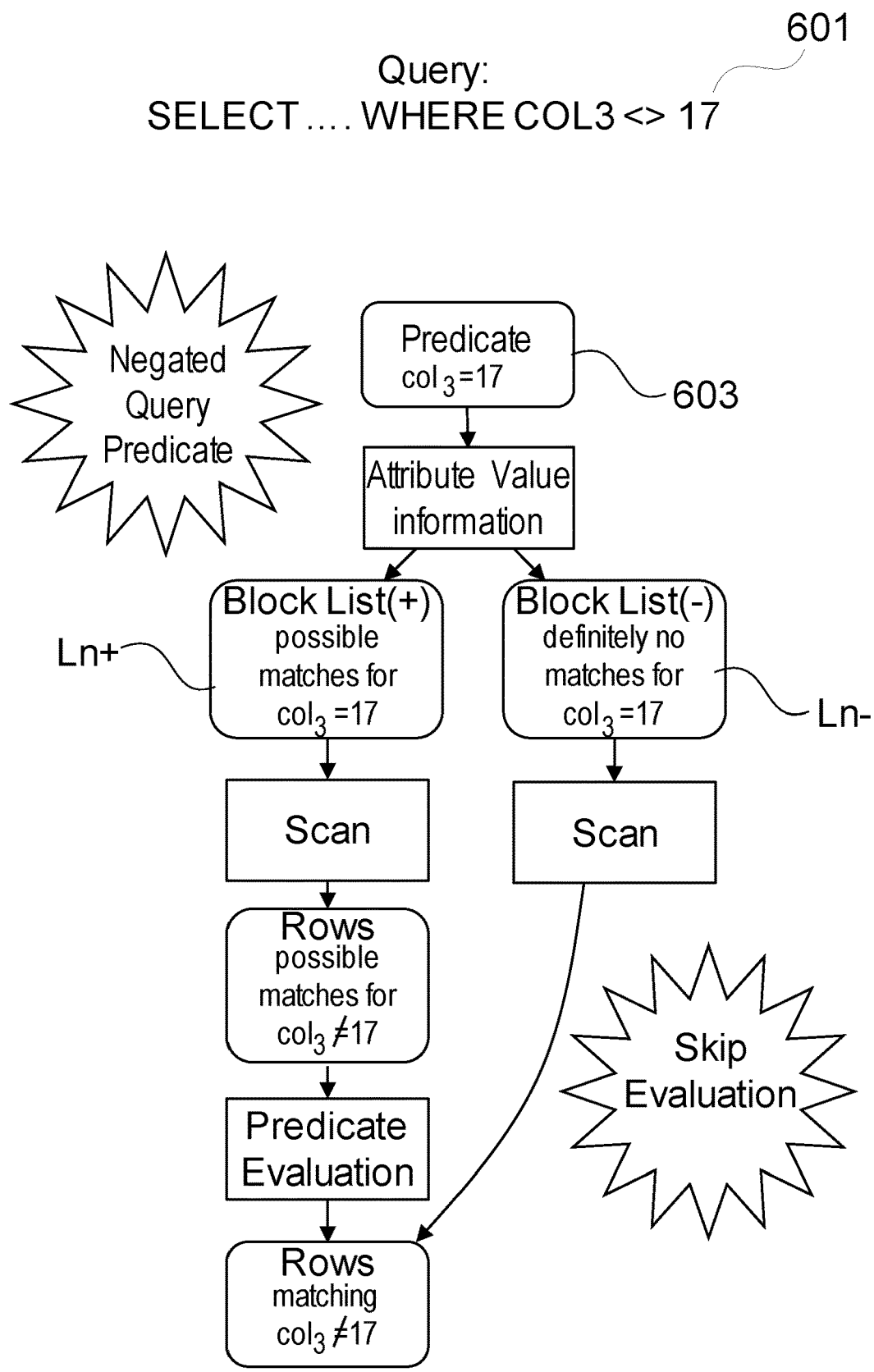
FIG. 6 is a flow diagram illustrating an example method for processing an inequality predicate on data blocks, in accordance with an embodiment of the present invention.

FIG. 6 is a flow diagram illustrating an example method for processing an inequality predicate on data blocks 127A-N, in accordance with an embodiment of the present invention. FIG. 6 shows an example query that comprises an inequality predicate (col3≠17) 601 that forms a single selection expression. Col3 is an attribute e.g., 131B of the set of data blocks 127A-N. First, the negative inequality predicate is negated 603 to obtain a positive equality predicate (col3=17), because the attribute value information may only work for positive predicates. Both resulting data-block lists may be scanned, retrieved, or read, but the negative predicate is only evaluated on rows from data blocks Ln+ that may have matches for the positive predicate. Rows from data blocks that definitely do not contain matches for the positive predicate are known to match the negative predicate and thus skip predicate evaluation of col3≠17.

A query comprising one or more join operations may work in a similar fashion; once the values for the minor (or "inner") side of the join have been computed, the join can be represented as a more complex predicate. A possible cross-product in the join only comes to play when there is a match. Join types that operate on non-matches, e.g. anti joins or the outer part of left outer joins, do not produce a cross-product and thus may skip the entire join computation, just like predicate evaluation is skipped in FIG. 6. As joins are typically a lot more expensive to compute than predicates, the reduction in CPU load is even more relevant.

Inequality Predicates

Figure 7:
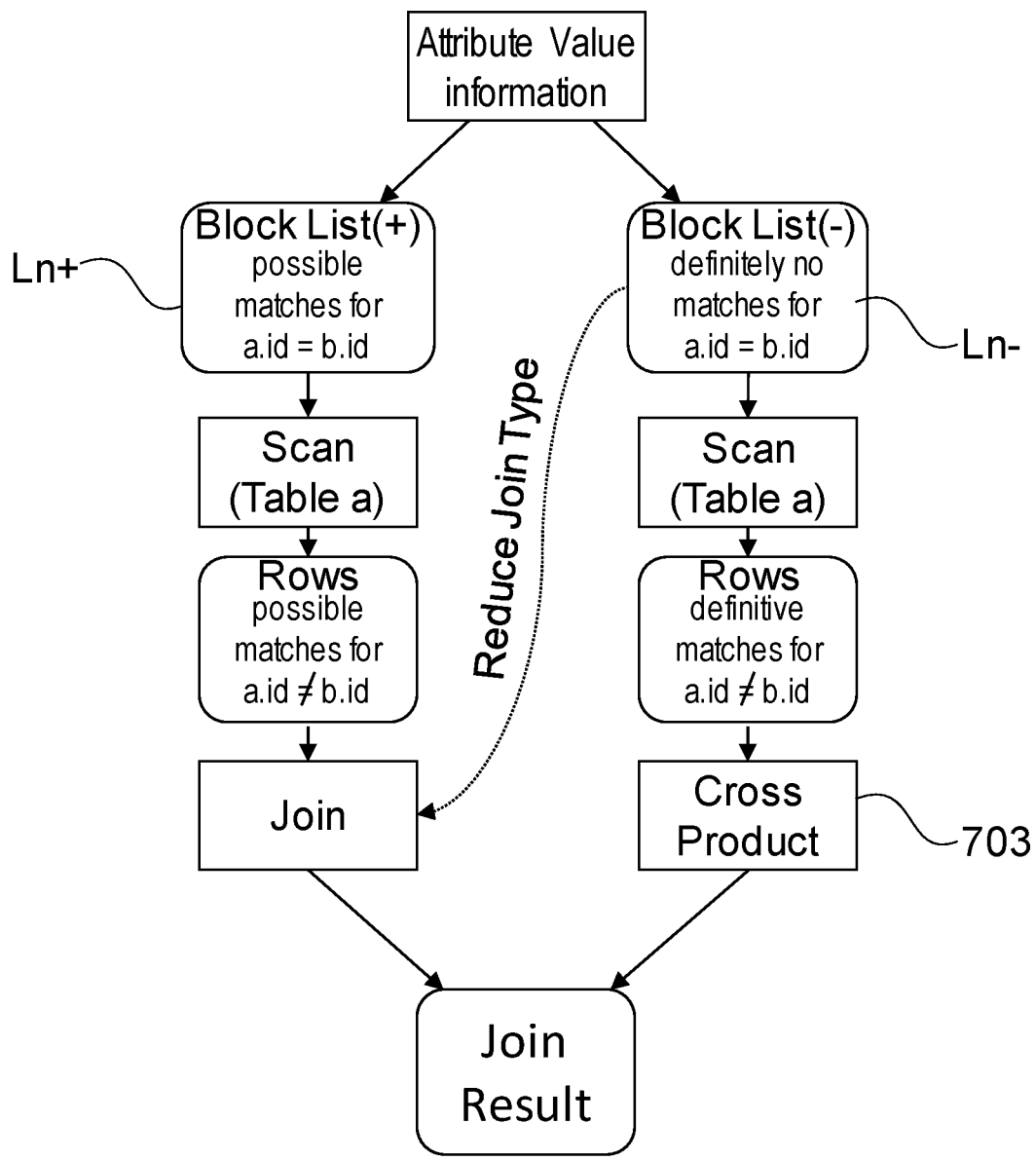
FIG. 7 is a flow diagram illustrating an example method for processing a join with an inequality predicate on data blocks, in accordance with an illustrative embodiment of the present invention.

Inequality predicates in the form of "column constant" may be processed as described above e.g., with reference to FIG. 2 and FIG. 7. Inequality predicates in the form of "column NOT IN constant-list" are semantically equal to "(column≠constant1∪column≠constant2∪ . . . )", which can then be processed as described above with reference to the disjunction example of FIG. 2.

Negated Range Predicates

In this case the query to be evaluated or processed on the set of data blocks 127A-N may comprise a negated range predicate. In this case, for example, the attribute value information assigned to each data block of the set of data blocks 127A-N may comprise the minimal and maximal attribute values in a data block.

Negated range predicates on a closed range in the form of "column NOT BETWEEN constantlow AND constanthigh" ("column" may for example refer to attribute 131B) may not be converted to a positive range predicate, and they may be handled using the present method. As with inequality predicates, the metadata may be queried with the non-negated version of the negated range predicate and the two resulting block lists (e.g., Ln− and Ln+) are processed as described above.

Note that the two expressions "column BETWEEN constantlow AND constanthigh" and "(column≥constantlow∧column≤constanthigh)" may be equal. The same holds for their negated counterparts. Moreover, all statements of rule applicability also hold for all types of inclusive and exclusive ranges (>, <, ≥, ≤).

In addition to that, note that a LIKE string matching operation that does not start with a wildcard can be expressed as a range predicate. Thus, "column NOT LIKE 'abc %'", for instance, is a negated range predicate and may be treated using the present method.

Boolean Expressions

Conjunctions and disjunctions of negated predicates may be handled using the present method (e.g., as described with reference to FIG. 2), as long as they refer to columns (e.g., attribute 131B) of the same table e.g., 127. By "negated predicates" it is meant inequality predicates or negated range predicates as discussed above.

For conjunctions of negated predicates (p1∧p2∧ . . . ), metadata may be queried for the corresponding positive version of each negated predicate individually. The negative block lists (Ln−1, Ln−2 . . . ) are intersected, such that only those data blocks that definitely do not contain a match for the positive version of all predicates skip predicate evaluation (of predicate p1∧p2∧ . . . ). The rows of all other data blocks may pass predicate evaluation.

For disjunctions of negated predicates (p1∨p2∨ . . . ), metadata is queried for the corresponding positive version of each negated predicate individually. The negative block lists (Ln−1, Ln−2 . . . ) are unified, such that all data blocks that definitely do not contain a match for the positive version of any predicate skip predicate evaluation. Only the rows of the remaining data blocks may pass predicate evaluation.

In another example, conjunctions and disjunctions of a positive predicate Pp and a negated predicate pn may be handled by the present method as follows.

For conjunctions of predicates (p=pp∧pn), the metadata may be first queried for pp. The obtained negative block list cannot contain any matches for pp and is thus irrelevant for the entire conjunction p=pp∧pn. Only the positive block list Lp+ is kept, as it may contain rows matching pp. Subsequently, metadata is queried for the corresponding positive version of pn.

Both resulting block lists Ln+ and Ln− are intersected with Lp+:

$$L+=Lp+\cap Ln+$$

$$L-=Lp+\cap Ln-$$

All data blocks from Lp+ need predicate evaluation for pp, due to the one-sided nature of the metadata. Similarly, all data blocks from Ln+ may be checked for pn. Only the data blocks from Ln− are known to match pn. Thus, block list L+ may have to pass predicate evaluation for p. But for L− it may be sufficient to check for pp only and skip pn.

For disjunctions of predicates (p=pp∨pn), the metadata may be first queried for the corresponding positive version of pn. The obtained negative block list Ln− is known to contain only rows that match pn and thus also p. These rows may skip predicate p=pp∨pn evaluation entirely. The positive block list Ln+ may contain matches for p and is kept. Subsequently, the metadata may be queried for pp resulting in positive and negative block lists Lp+ and Lp−. Rows from Lp+ may match pp and rows from Lp− do not to match pp, but may still match pn. Thus, the following block lists may be computed:

1. Lnone=Ln−, where Lnone=Ln− contains only rows that match P and thus needs no checking at all, as stated above.
2. Lboth=Lp+∩ Ln+, where Lboth may contain matches for both Pp and Pn, so that it may have to undergo complete evaluation for the entire disjunction p.
3. Lp=Lp+\(Lnone∪Lboth), where Lp contains rows that may match Pp, but that have not been addressed yet by the upper two cases. These rows may only be checked for Pp.
4. Ln=Lp−∩ Ln+, where Ln contains rows that definitely do not match pp but may still match pn. These rows may only need to be evaluated for pn.

Besides the aforementioned positive and negative predicates, a third class of predicates pA exists, which cannot be used on the metadata. Examples include LIKE patterns starting with wildcards, arbitrary mathematical expressions, or predicates involving columns of more than one table.

Conjunctions including a non-indexable predicate (pA∧p) can first be evaluated without pA using the attribute value information, as described above. Subsequently, the predicate may be evaluated on the result.

For disjunctions (pA∨pn) including a non-indexable predicate pA and a negative predicate pn, the metadata may be queried for pn. Those data blocks which definitely match pn can skip any predicate evaluation of (pA∨pn). All other data blocks may be checked for pA.

A NOT operator (¬) in a Boolean expression converts its operand according to the following rules. The result is applicable for further processing. The following nine expressions of Boolean algebra may be important for transitive applicability in arbitrary Boolean expressions:
 1.) "¬(¬(p))"⇒"p".
 2.) "¬(column≠constant)"⇒"column=constant", i.e. negated predicates become positive.
 3.) "¬(column=constant)"⇒"column constant", i.e. positive predicates become negated.
 4.) "¬(column NOT IN constant-list)"⇒"¬(¬(column IN constant-list))", which according to the first rule is equal to the positive predicate "column IN constant-list" and thus "(column=constant1∨column=constant2∨ . . . )".
 5.) "¬(column<constant)"⇒"column≥constant", i.e. positive open range predicates are converted into their corresponding inverse open range predicates. This holds for all open range predicates, including <, ≤, >, ≥.
 6.) "¬(column NOT BETWEEN constantlow AND constanthigh)"⇒"column BETWEEN constantlow AND constanthigh", i.e. negated predicates becomes positive.
 7.) "¬(column BETWEEN constantlow AND constanthigh)"⇒"column NOT BETWEEN constantlow AND constanthigh", i.e. positive predicates becomes negated.
 8.) "¬(p1∧p2∧ . . . )"⇒"(¬(p1)∨¬(p2)∨ . . . )"
 9.) "¬(p1∨p2∨ . . . )"⇒"(¬(p1)∧¬(p2)∧ . . . )"

Joins are yet expensive operations in term of CPU. The present method (e.g., as described with reference to FIG. 2) may be employed for join types in which negated existentially quantified predicates occur or which carry a negated join predicate. In this case it is assumed that the inner (or "minor") side of the join has been processed and that its values are represented in a way that allows querying the metadata for data blocks with potential join matches. A way to do this is to record the minimal and maximal value that occurred on the minor side. Other ways include Bloom filters containing all values or lists of value ranges that occurred.

An anti join (NOT EXISTS) is one of the join type on which the present method may be employed. The metadata may be queried with the minor side of the join. The resulting list of data blocks containing possible matches for the corresponding positive version of the join predicate (i.e., EXISTS predicate) is fed the anti-join, as usually. However, the rows from data blocks for which the positive join predicate does definitely not hold may bypass the join and are directly fed to the processing node after the join. Depending on the chosen join implementation this may save a sort step or a hash table lookup for those rows and thus can be a significant performance differentiator.

A left outer join may be expressed as an inner join plus an anti-join. For example, all rows of the outer (or "major") side that match a row from the inner side of the join are processed like an inner join would process them. All non-matching rows of the outer side still survive the join and the result row is assigned NULL values for the inner columns. A full outer join adds a left anti-join (left NOT EXISTS) on top of it by further including the rows of the inner side that did not match any outer row, padded with NULL values for the outer columns.

The present method may accelerate the non-matching rows of the outer side of a left or full outer join. The metadata may be queried with the minor side of the join. The positive block list is fed to the join implementation as usually. Yet data blocks of the outer side which definitely do not any rows of the inner side can undergo simpler processing. All that may be needed is to assign them NULL values for the inner columns and they are ready for the processing node after the join.

FIG. 7 is a flow diagram illustrating an example method for processing a join with an inequality predicate on data blocks, in accordance with an illustrative embodiment of the present invention. This can be an inner join or a left, right, or full outer join. For example, FIG. 7 depicts query 701:

SELECT . . . FROM a RIGHT OUTER JOIN b ON a.id< >bid

In this case, the metadata may be queried with the corresponding positive version of the join predicate a.id< >bid and the values of the inner (or "minor") side. In the case of a right or full outer join it may be important to process the negative block list Ln− obtained from the metadata first. The rows from the negative block list Ln− are known to be a join match. The computation (hash lookup or sort and merge) can thus be skipped. However, these rows do create a cross-product. So their cross-product 703 with the entire minor side of the join may be computed. In the case of a right or full outer join, also all rows of the inner side are known to match some rows from the outer part. Consequently, as soon as the negative block list is non-empty, a right or full outer join can effectively be reduced to an inner or left outer join, respectively. Subsequently, the positive block list Ln+ is fed to the join as usual as illustrated in FIG. 7.

Additionally, count aggregates on negated predicates or joins may be accelerated, provided the sizes of the data blocks are known. Furthermore, it is generally possible to record the number of rows in every block if this number may vary. Using the following query as an example:

SELECT COUNT(*) FROM a WHERE id NOT BETWEEN 10000 AND 20000 SELECT COUNT(*) FROM a WHERE id NOT IN (SELECT id FROM b) SELECT COUNT(*) FROM a WHERE name NOT LIKE 'M %'

Under this example, metadata is queried for the predicate or join. The positive block list may be processed. However, the negative block list doesn't need to be read at all. All that is needed is to increment the count aggregate by the size of each data block.

The exemplary embodiment may hold even though it is unlikely that the row counts are actively maintained for all data blocks in case of deletes. Analytical database systems typically implement multi-version concurrency control in which every row carries a visibility timestamp range. The transactional visibility mask on this range is thus a range predicate which can be combined with the negated query predicate or join as pointed out above.

Figure 8:
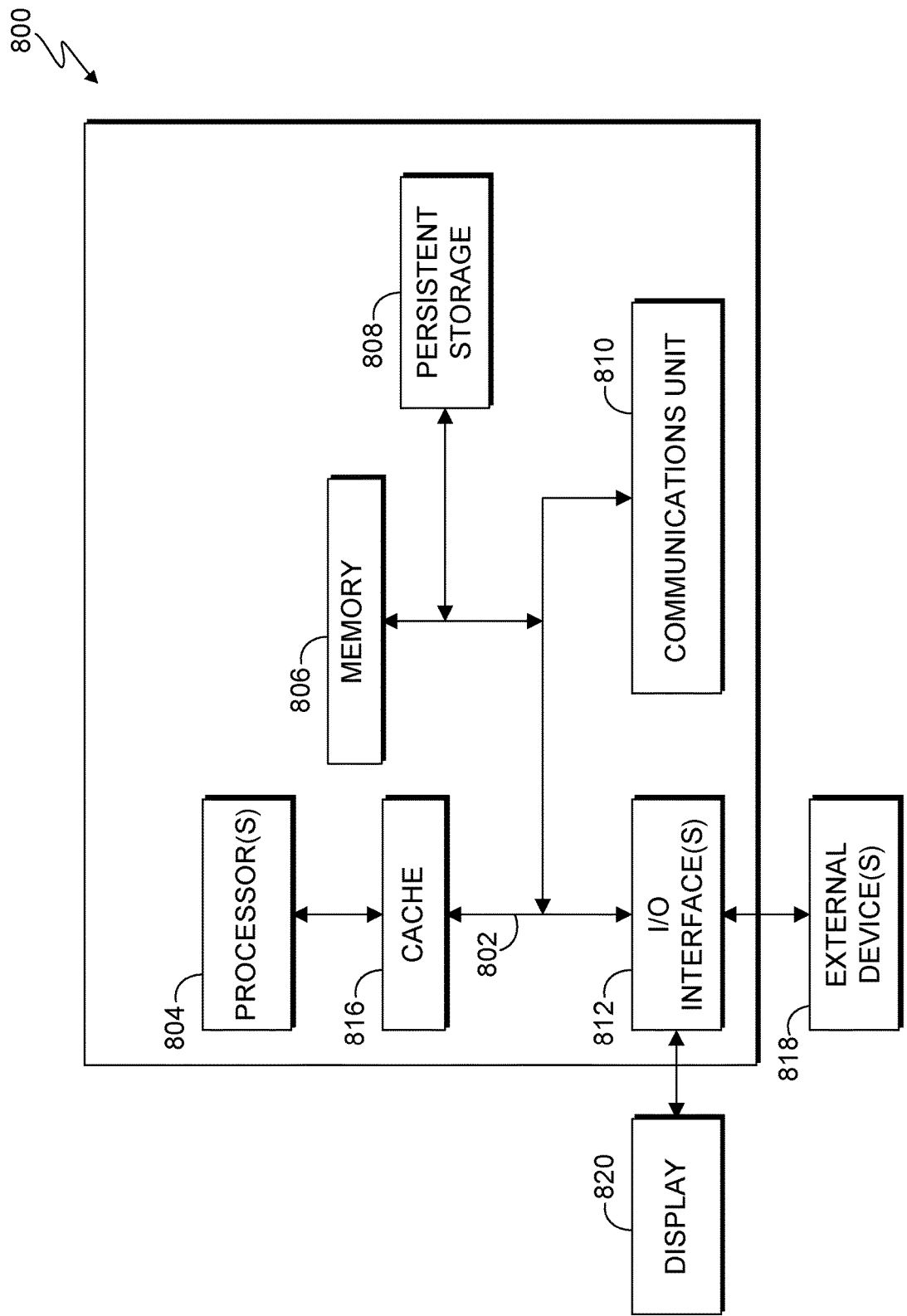
FIG. 8 is a block diagram of components of a computing device, in accordance with an illustrative embodiment of the present invention.

FIG. 8 is a block diagram of internal and external components of a computer system (i.e., computing device), generally designated 800, which is representative of the computer system of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device 800 includes communications fabric 802, which provides communications between computer processor(s) 804, memory 806, cache 816, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present invention may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of a network. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to computing device 800. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing a query on a set of data blocks, the method comprising:
    generating an attribute value information on at least one attribute, for each data block of the set of data blocks;
    generating a first condition on the at least one attribute, wherein the first condition negates each selection expression of at least one selection expression;
    generating a first set of conditions that comprises the generated first condition on at least one attribute;
    selecting a positive subset of data blocks, of the set of data blocks, for each condition of the first set of conditions, wherein the positive subset of data blocks, of the set of data blocks satisfies a condition of the first set of conditions, using the attribute value information;
    selecting a negative subset of data blocks, of the set of data blocks, for each condition of the first set of conditions, wherein the negative subset of data blocks, of the set of data blocks does not satisfies a condition of the first set of conditions, using the attribute value information; and
    determining a skipped portion of the negative subsets of the data blocks, using a selection condition.

2. The method of claim 1, further comprising:
    receiving the set of data blocks and the query, wherein the set of data blocks comprises at least one attribute and, wherein the query specifies the selection condition on the at least one attribute, wherein the selection condition comprises at least one selection expression.

3. The method of claim 2, wherein receiving the selection condition further comprises:
    receiving a conjunction of a first selection expression and a second selection expression, wherein the first selection expression comprises a first negation operator, and wherein the second selection expression comprises a second negation operator; and
    determining a skipped portion of the data blocks, wherein the skipped portion of the data blocks comprises selecting common data blocks of a first negative subset of data blocks and selecting common data blocks of a second negative subset of data blocks.

4. The method of claim 3, wherein the first negation operator comprises: at least one of: an inequality operator; and a negated range operator.

5. The method of claim 1, wherein receiving the selection condition further comprises:
    receiving a conjunction of a first selection expression and a second selection expression, wherein the first selection expression comprises a positive operator, and wherein the second selection expression comprises a first negative; and
    determining the skipped portion of the data blocks, wherein the skipped portion of the data blocks comprises a first negative subset of data blocks.

6. The method of claim 1, wherein receiving the selection condition further comprises:
  receiving a disjunction of a first selection expression and a second selection expression, wherein the first selection expression comprises a first negation operator, and wherein the second selection expression comprises a second negation operator; and
  determining the skipped portion of the data blocks, wherein the skipped portion of the data blocks comprises first negative subset of data blocks and a second negative subset of data blocks.

7. The method of claim 1, wherein receiving the selection condition further comprises:
  receiving a conjunction of a first selection expression and a second selection expression, wherein the first selection expression comprises a positive operator, and wherein the second selection expression comprises a first negative; and
  determining the skipped portion of the data blocks, wherein the skipped portion of the data blocks comprises the second negative subset of data blocks.

8. The method of claim 1, wherein generating the attribute value information further comprises:
  generating a multi-dimensional data structure, wherein the multi-dimensional data structure represents the set of data blocks; and
  adding a data element, for each data block of the set of data blocks, into the multi-dimensional data structure, wherein the data element comprises multiple values associated with the attribute.

9. The method of claim 1, further comprising:
  selecting data elements, of a multi-dimensional data structure, whose value satisfies the condition wherein, a positive subset of data blocks correspond to a set of selected data elements, and the negative subset of data blocks corresponds to a set of non-selected elements of the multi-dimensional data structure.

10. The method of claim 8, wherein the multi-dimensional data structure further comprises a spatial index.

11. The method of claim 1, wherein generated result data, further comprises:
  processing the negative portion non-skipped portion of the negative subsets of the data blocks.

12. The method of claim 1, further comprising:
  generating result data, wherein the generated result data comprises:
  processing the positive subset of the data blocks.

* * * * *